UNITED STATES PATENT OFFICE.

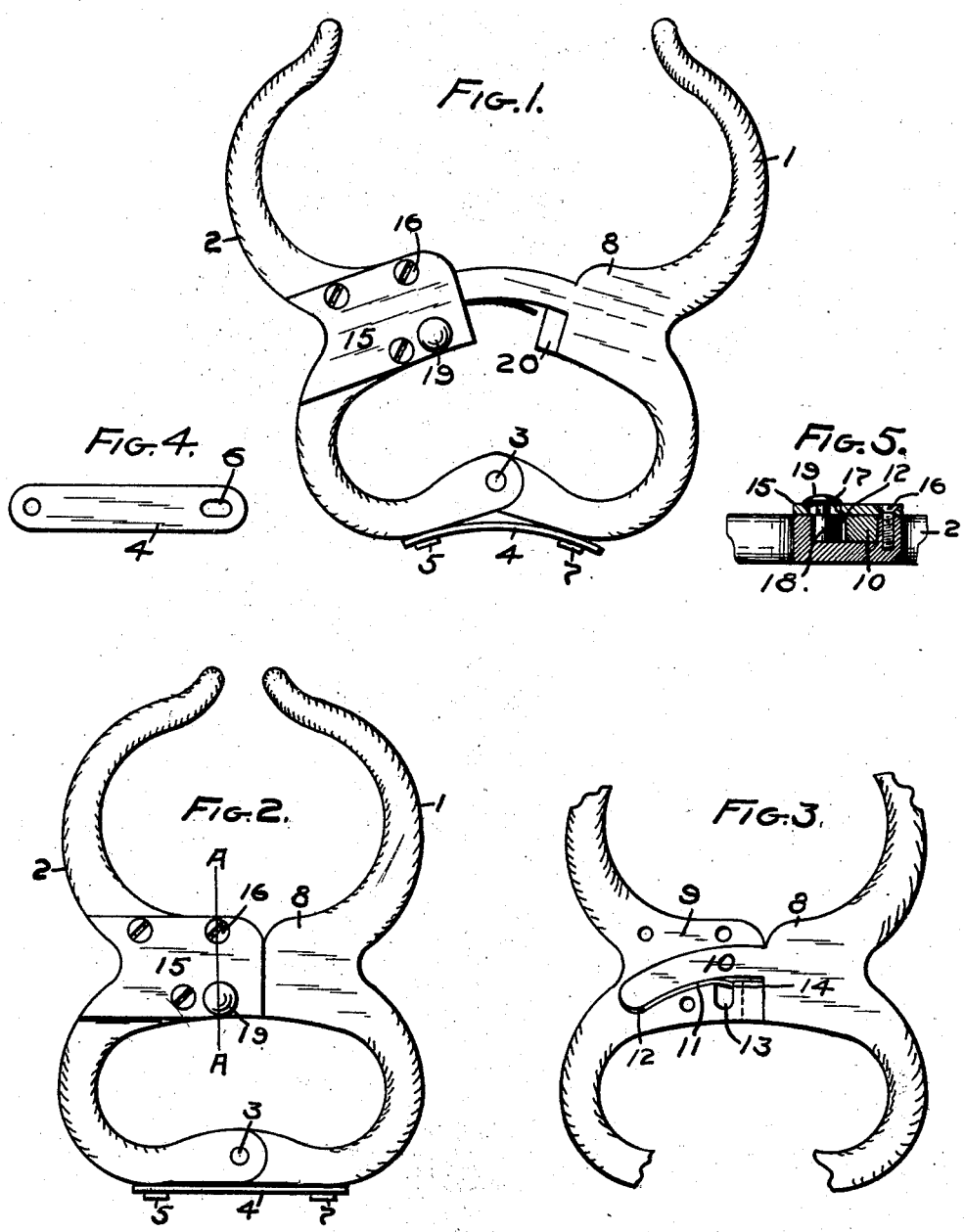

GEORGE A. HARRISSON, OF LAFAYETTE, INDIANA, ASSIGNOR OF ONE-HALF TO WILLIAM C. MITCHELL, OF SAME PLACE.

POLICE-NIPPERS.

SPECIFICATION forming part of Letters Patent No. 679,841, dated August 6, 1901.

Application filed March 22, 1901. Serial No. 52,453. (No model.)

*To all whom it may concern:*

Be it known that I, GEORGE A. HARRISSON, of Lafayette, county of Tippecanoe, and State of Indiana, have invented certain new and useful Police-Nippers; and I do hereby declare that the following is a full, clear, and exact description thereof, reference being had to the accompanying drawings, in which like figures refer to like parts.

The object of this invention is to make police-nippers that are quickly and easily manipulated in placing them on the wrist and removing the same and convenient to hold while in use. To accomplish this object, I provide a pair of doubly-curved grasping members pivoted together at one end and with means for locking them together intermediate their ends. When brought together, the outer curves of the members grasp the wrist of a prisoner and the curves at the other end form a convenient handle for the officer using the nippers. When closed, the nippers are shaped somewhat like the numeral 8, and the members are locked intermediate their ends by an arm from one member extending into a recess in the other member and having an automatic catch, and means are provided for releasing the catch.

The general nature of the invention will be understood from the accompanying drawings and the description and claims following.

In the drawings, Figure 1 is a plan of the nippers open. Fig. 2 is a plan of them closed. Fig. 3 is a plan of the central portion of the nippers with the top plate removed. Fig. 4 is an elevation of the spring at the joint of the two members of which the nippers are composed. Fig. 5 is a section on the line A A, Fig. 2.

The police-nippers shown in the drawings consist of two members (marked 1 and 2) pivotally connected at 3 and provided with a spring at their pivotal connection which tends to close them. The spring consists of the flat metal piece 4, secured by the bolt 5 to the member 2 and having at the other end the slot 6, through which the bolt 7 from the member 1 loosely extends. The members 1 and 2 are formed of a double curve, so as to have the extensions 8 and 9 intermediate their ends, which abut against each other when the nippers are closed, as appears in Fig. 3. These extensions are locked together when desired. The means for locking the members together consist of the arm 10, extending from the extension 8 of the member 1 and curved concentric with the pivot 3. It has secured to it a spring-catch 11, consisting of a flat spring secured at one end and turned back somewhat at the other end. The extension 9 of the member 2 is correspondingly provided with a groove 12, concentric also with the pivot 3. It also has another groove, 13, (shown in Fig. 3,) extending almost at a right angle from the groove 12, which leaves a shoulder 14 to be engaged by the catch, as appears in Fig. 3. On the extension 9 of the member 2 a plate 15 is secured by the screw 16 and has in it a slot 17, through which a pin 18 extends, with a head 19 thereon, as appears in Fig. 5. The pin 18 extends into the groove 13, and the nippers are unlocked by pushing the head 19 toward the catch 11, so that the pin 18 will press said catch toward the arm 10 out of engagement with the shoulder 14. The two members then open.

The extension 8 has a tongue 20, which enters a corresponding recess in the extension 9. (Not directly shown herein, but which appears by the dotted lines in Fig. 3.) This arrangement is to give the union between the two members greater strength when the nippers are closed.

What I claim as my invention, and desire to secure by Letters Patent, is—

1. Police-nippers consisting of two grasping members pivoted together at one end, and means intermediate their ends for locking them together.

2. Police-nippers consisting of two grasping members doubly curved substantially as shown and pivoted together at one end and with extensions intermediate their ends that abut when the nippers are closed, and means for locking said extensions together.

3. Police-nippers consisting of two grasping members doubly curved substantially as shown and pivoted together at one end and with extensions intermediate their ends that abut when the nippers are closed, an arm extending from one of said extensions with a spring-catch thereon, a recess in the other extension to receive said arm, a stop to engage the catch, and means for releasing the catch.

4. Police-nippers consisting of two grasping members doubly curved substantially as shown and pivoted together at one end and with extensions intermediate their ends that abut, a spring tending to close said members, an arm extending from one of the extensions on said member curved concentric with the pivotal connection of said members, a spring-catch secured on said arm, a groove in the extension on the other member that is concentric with the pivotal connection of said members to receive said arm, a shoulder adjacent to said groove to engage the catch on said arm, a plate secured over said groove having a slot in it, and a pin extending through said slot into engagement with the spring-catch whereby when the pin is moved it will release the catch.

In witness whereof I have hereunto affixed my signature in the presence of the witnesses herein named.

GEORGE A. HARRISSON.

Witnesses:
N. I. THROCKMORTON,
GEORGE ROGERS.